(12) United States Patent
Endo et al.

(10) Patent No.: US 9,819,173 B2
(45) Date of Patent: Nov. 14, 2017

(54) OVERHEAT PROTECTION CIRCUIT AND VOLTAGE REGULATOR

(71) Applicant: Seiko Instruments Inc., Chiba-shi, Chiba (JP)

(72) Inventors: Daiki Endo, Chiba (JP); Fumimasa Azuma, Phnom Penh (KH)

(73) Assignee: Seiko Instruments Inc. (JP)

( * ) Notice: Subject to any disclaimer, the term of this patent is extended or adjusted under 35 U.S.C. 154(b) by 389 days.

(21) Appl. No.: 14/656,196

(22) Filed: Mar. 12, 2015

(65) Prior Publication Data

US 2015/0263507 A1    Sep. 17, 2015

(30) Foreign Application Priority Data

Mar. 14, 2014  (JP) .................. 2014-052145

(51) Int. Cl.
  *H02H 5/04* (2006.01)
  *H02H 7/12* (2006.01)
  *G05F 1/567* (2006.01)

(52) U.S. Cl.
  CPC ............. *H02H 5/044* (2013.01); *G05F 1/567* (2013.01)

(58) Field of Classification Search
  CPC .................. H02H 5/044; G05F 1/567

USPC ........................................... 361/180
See application file for complete search history.

(56) References Cited

U.S. PATENT DOCUMENTS

| 2009/0059997 A1* | 3/2009 | Sudo ...................... G01K 7/015 374/173 |
| 2010/0321845 A1* | 12/2010 | Imura ..................... G05F 1/569 361/86 |

FOREIGN PATENT DOCUMENTS

JP   2002-108465 A   4/2002

* cited by examiner

*Primary Examiner* — Thienvu Tran
*Assistant Examiner* — Kevin J Comber
(74) *Attorney, Agent, or Firm* — Brinks Gilson & Lione

(57) ABSTRACT

To provide an overheat protection circuit which is not affected by a leak current while being low in current consumption and good in detection accuracy, and a voltage regulator equipped with the overheat protection circuit. An overheat protection circuit is configured to include a leak current detection circuit which detects that a leak current has flowed at a high temperature, a bias circuit which allows a bias current to flow in response to an output signal of the leak current detection circuit, and a temperature detection circuit operated by the bias current.

5 Claims, 3 Drawing Sheets

OVERHEAT PROTECTION CIRCUIT AND VOLTAGE REGULATOR

RELATED APPLICATIONS

This application claims priority under 35 U.S.C. §119 to Japanese Patent Application No. 2014-052145 filed on Mar. 14, 2014, the entire content of which is hereby incorporated by reference.

BACKGROUND OF THE INVENTION

Field of the Invention

The present invention relates to an overheat protection circuit, and a voltage regulator equipped with the same.

Background Art

There is a case where a voltage regulator is large in power loss in an output transistor built therein and results in destruction itself due to its self-heating when a load current is large. There has therefore been provided an overheat protection circuit which stops the supply of power to a load at a predetermined temperature or higher.

FIG. 4 is a circuit diagram of a related art overheat protection circuit provided in a voltage regulator. The related art overheat protection circuit is equipped with a diode 61, current sources 62 and 64, resistors 2, 3 and 63, a comparator 65, PMOS transistors 1 and 66, a ground terminal 100, a power supply terminal 101, and an output terminal 102. Though a divided voltage Vfb at a connection point of the resistors 2 and 3 is not illustrated in the figure, but connected to an error amplifier circuit of the voltage regulator. The error amplifier circuit controls an output transistor 1 according to a reference voltage Vref and the divided voltage Vfb.

As a current flowing through the diode 61, a constant current is made to flow by the current source 62. When the constant current is made to flow through the diode 61, the temperature dependence relative to the forward bias of the diode 61 becomes about −2 mV/° C. in the case of silicon. The reference voltage Vref is generated at a connection point of the resistor 63 and the current source 64 and input to a non-inversion input terminal of the comparator 65. When the voltage on the cathode side of the diode 61 is assumed to be Vf, and the voltage of the power supply terminal 101 is assumed to be VDD, the voltage Vf is a voltage obtained by subtracting a forward bias voltage of the diode 61 from the power supply voltage VDD. The voltage Vf becomes Vf<Vref in a normal state, and hence the PMOS transistor 66 is turned off by the output of the comparator 65 to stop control on the PMOS transistor 1.

When the voltage Vf changes at the rate of about −2 mV/° C. with a rise in the temperature of an IC and becomes equal to the reference voltage Vref, the output of the comparator 65 is inverted so that the PMOS transistor 1 is turned off. Consequently, heat is not generated in the PMOS transistor 1 and hence the temperature of the IC is lowered. Then, when the voltage Vf becomes smaller than the reference voltage Vref, the output of the comparator 65 is inverted again so that the PMOS transistor 1 is turned on (refer to, for example, Patent Document 1).

PATENT DOCUMENT 1

Japanese Patent Application Laid-Open No. 2002-108465

SUMMARY OF THE INVENTION

The related art overheat protection circuit is however accompanied by a problem that the influence of a leak current generated in terms of an element structure of a semiconductor becomes an unignorable value, and the leak current affects the temperature characteristic of a current for generating a reference voltage of the overheat protection circuit, thereby reducing the accuracy of a detection operation at a desired temperature.

The present invention has been made in view of the above problem and provides an overheat protection circuit which is not affected by a leak current while being low in current consumption and good in detection accuracy, and a voltage regulator equipped with the overheat protection circuit.

In order to solve the related art problems, an overheat protection circuit of the present invention, and a voltage regulator equipped with the overheat protection circuit are configured as follows:

The overheat protection circuit is provided with a leak current detection circuit which detects that a leak current has flowed at a high temperature, a bias circuit which allows a bias current to flow in response to an output signal of the leak current detection circuit, and a temperature detection circuit operated by the bias current.

The overheat protection circuit of the present invention, and the voltage regulator equipped with the overheat protection circuit is operated with low current consumption at a low temperature and enables accurate temperature detection without being affected by a leak current at a high temperature.

DESCRIPTION OF THE PREFERRED EMBODIMENTS

Preferred embodiments of the present invention will hereinafter be described with reference to the accompanying drawings.

<First Embodiment>

Figure 1:
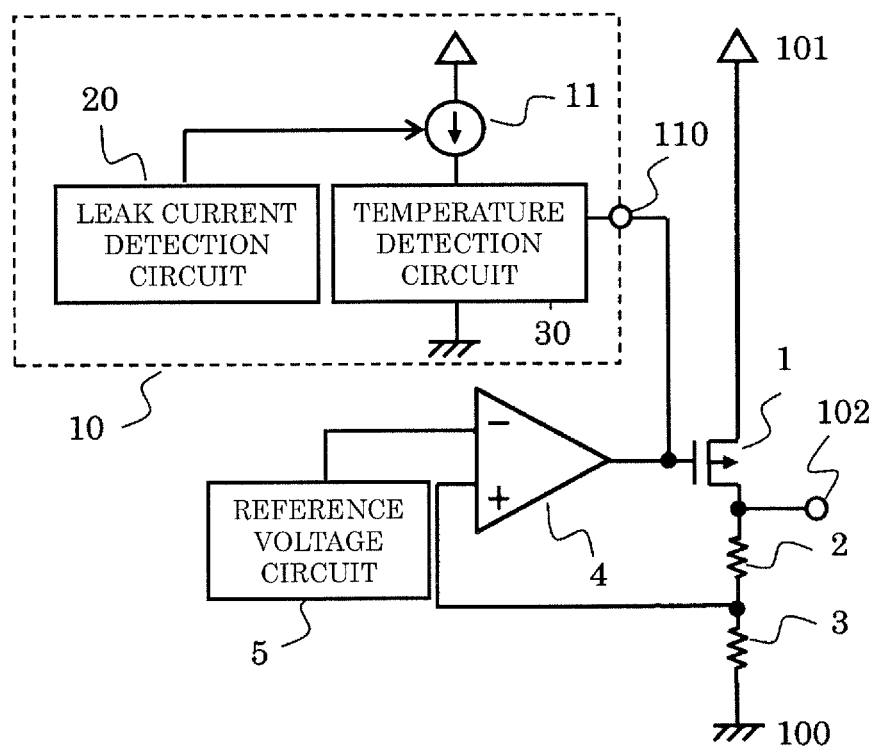
FIG. 1 is a circuit diagram of a voltage regulator provided with an overheat protection circuit of a first embodiment.

FIG. 1 is a circuit diagram of a voltage regulator equipped with an overheat protection circuit of a first embodiment. The voltage regulator equipped with the overheat protection circuit of the first embodiment includes the overheat protection circuit 10, an output transistor 1, resistors 2 and 3, an error amplifier circuit 4, a reference voltage circuit 5, a ground terminal 100, a power supply terminal 101, and an output terminal 102. The overheat protection circuit 10 includes a current source 11, a leak current detection circuit 20, a temperature detection circuit 30, and an output terminal 110. The current source 11 is a bias circuit which allows a bias current of the temperature detection circuit 30 to flow.

Figure 2:
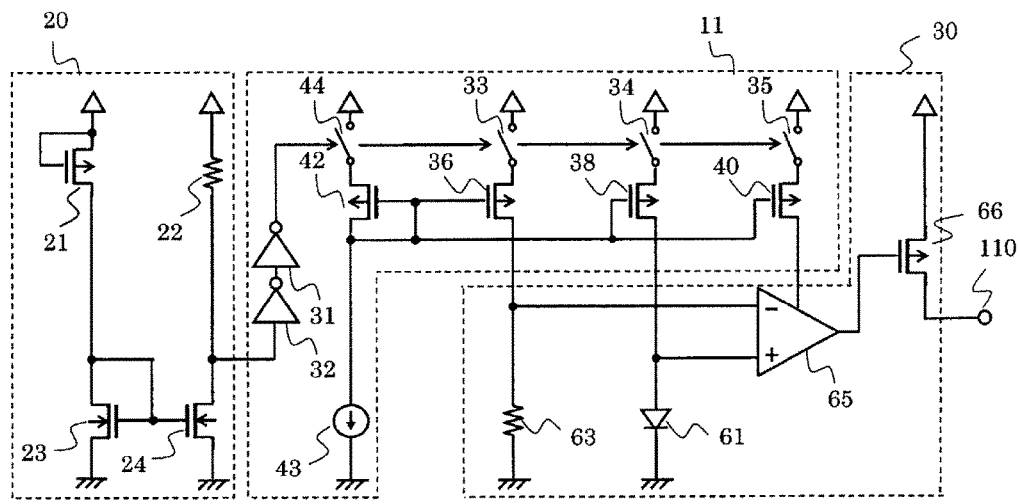
FIG. 2 is a circuit diagram of the overheat protection circuit of the first embodiment.

FIG. 2 is a circuit diagram of the overheat protection circuit of the first embodiment. The overheat protection circuit of the first embodiment includes PMOS transistors 21, 42, 36, 38, 40 and 66, NMOS transistors 23 and 24, resistors 22 and 63, inverters 31 and 32, switch circuits 33, 34, 35 and 44, a current source 43, a diode 61, a comparator 65, and an output terminal 110. The PMOS transistor 21, the NMOS transistors 23, and 24, and the resistor 22 configure the leak current detection circuit 20. The inverters 31 and 32, the switch circuits 33, 34, 35 and 44, the current source 43, and the PMOS transistors 42, 36, 38 and 40 configure the current source 11. The resistor 63, the diode 61, the comparator 65, and the PMOS transistor 66 configure the temperature detection circuit 30.

A description will be made about the connections of the voltage regulator equipped with the overheat protection circuit of the first embodiment. The error amplifier circuit 4 has an inversion input terminal connected to the reference voltage circuit 5, a non-inversion input terminal connected to a connection point of the resistors 2 and 3, and an output connected to the output terminal 110 of the overheat protection circuit 10 and a gate of the PMOS transistor 1. The other terminal of the resistor 3 is connected to the ground terminal 100, the other terminal of the resistor 2 is connected to the output terminal 102 and a drain of the PMOS transistor 1, and a source of the PMOS transistor 1 is connected to the power supply terminal 101.

The PMOS transistor 21 has a gate and source connected to the power supply terminal 101, and a drain connected to a gate and drain of the NMOS transistor 23. A source of the NMOS transistor 23 is connected to the ground terminal 100. The NMOS transistor 24 has a gate connected to the gate of the NMOS transistor 23, a drain connected to the power supply terminal 101 via the resistor 22, and a source connected to the ground terminal 100. The inverter 32 has an input connected to the drain of the NMOS transistor 24, and an output connected to an input of the inverter 31. An output of the inverter 31 is connected to the switch circuits 44, 33, 34 and 35 and controls ON/OFF thereof. The switch circuit 44 has one terminal connected to the power supply terminal 101, and the other terminal connected to a source of the PMOS transistor 42. The switch circuit 33 has one terminal connected to the power supply terminal 101, and the other terminal connected to a source of the PMOS transistor 36. The switch circuit 34 has one terminal connected to the power supply terminal 101, and the other terminal connected to a source of the PMOS transistor 38. The switch circuit 35 has one terminal connected to the power supply terminal 101, and the other terminal connected to a source of the PMOS transistor 40. A gate and drain of the PMOS transistor 42 are connected to one terminal of the current source 43, and the other terminal of the current source 43 is connected to the ground terminal 100. The PMOS transistor 36 has a gate connected to the gate of the PMOS transistor 42, and a drain connected to the resistor 63 and an inversion input terminal of the comparator 65. The other terminal of the resistor 63 is connected to the ground terminal 100. The PMOS transistor 38 has a gate connected to the gate of the PMOS transistor 42 and a drain connected to an anode of the diode 61 and a non-inversion input terminal of the comparator 65. A cathode of the diode 61 is connected to the ground terminal 100. The PMOS transistor 40 has a gate connected to the gate of the PMOS transistor 42, and a drain connected to the comparator 65. The PMOS transistor 66 has a gate connected to an output of the comparator 65, a drain connected to the output terminal 110, and a source connected to the power supply terminal 101.

A description will next be made about the operation of the voltage regulator equipped with the overheat protection circuit of the first embodiment. When the voltage regulator is operated at a high temperature or the temperature of the voltage regulator becomes high due to heat generated from the PMOS transistor 1 operated as an output transistor, a leak current is generated in the PMOS transistor 21. This leak current is mirrored by a current mirror circuit configured by the NMOS transistors 23 and 24 to bring the voltage of the input terminal of the inverter 32 to a voltage VSS of the ground terminal 100. In response to this voltage, the inverter 32 turns on the switch circuits 44, 33, 34 and 35 via the inverter 31. Thus, the current of the current source 43 is mirrored by current mirror circuits configured by the PMOS transistors 42 and 36, the PMOS transistors 42 and 38, and the PMOS transistors 42 and 40. Then, the bias current flows in the resistor 63, the diode 61 and the comparator 65 so that the temperature detection circuit 30 starts operating.

When the temperature of the voltage regulator is lower than a detection temperature set by the temperature detection circuit 30, the voltage generated in the diode 61 becomes higher than the voltage generated in the resistor 63. Thus, the comparator 65 turns off the PMOS transistor 66 to stop control on the operation of the PMOS transistor 1. When the temperature of the voltage regulator is higher than the detection temperature set by the temperature detection circuit 30, the voltage generated in the diode 61 becomes lower than the voltage generated in the resistor 63 so that the comparator 65 turns on the PMOS transistor 66. Then, the PMOS transistor 1 is turned off by a signal from the PMOS transistor 66. Thus, the operation of the voltage regulator is stopped to suppress heat generation.

Since the PMOS transistor 21 does not allow a leak current to flow when the voltage regulator is operated at the normal temperature, the input terminal of the inverter 32 is pulled up to a power supply voltage VDD of the power supply terminal 101. In response to this voltage, the inverter 32 turns off the switch circuits 44, 33, 34 and 35 via the inverter 31. Thus, the supply of the bias current of the temperature detection circuit 30 is stopped to stop the operation of the overheat protection circuit, thereby making it possible to reduce current consumption.

Incidentally, if the leak current detection circuit 20 is capable of detecting the leak current of the transistor of the current source 11 and outputting a detected signal to the current source 11, any configuration may be adopted. The leak current detection circuit 20 is not limited to the circuits as for the leak current detection circuits 20 illustrated in FIG. 2 and FIG. 3.

As described above, the voltage regulator equipped with the overheat protection circuit of the first embodiment is capable of stopping the operation of the overheat protection circuit when operated at the normal temperature to reduce current consumption and detecting a leak current only when operated at a high temperature to enable the overheat protection circuit to be operated.

<Second Embodiment>

Figure 3:
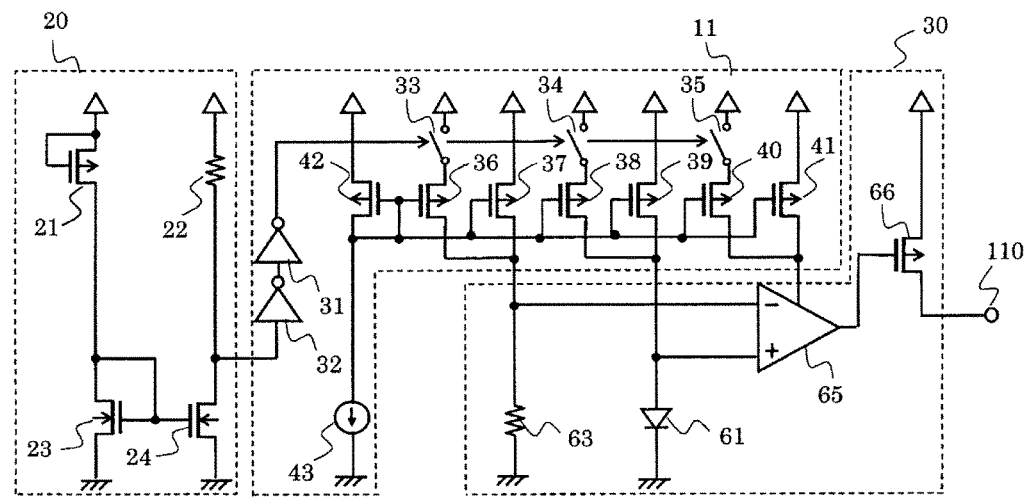
FIG. 3 is a circuit diagram of an overheat protection circuit of a second embodiment.
Figure 4:
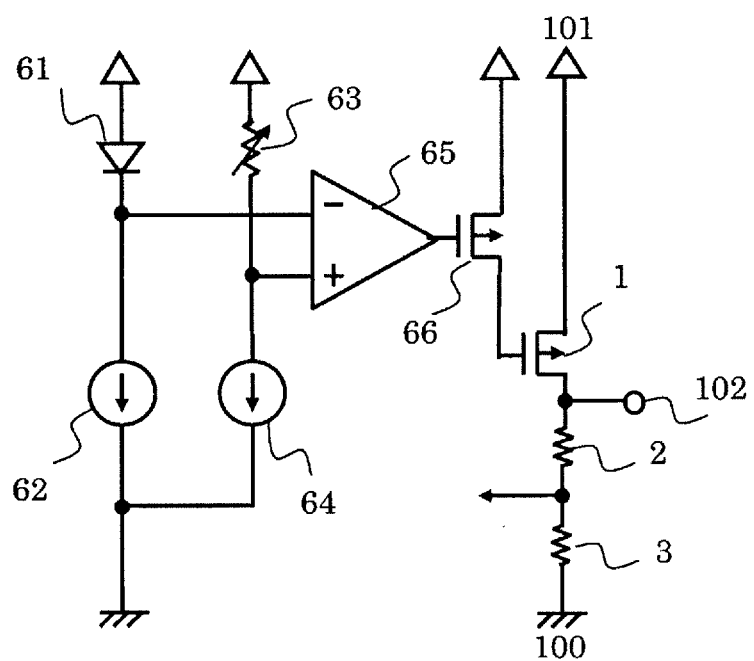
FIG. 4 is a circuit diagram of a related art overheat protection circuit.

FIG. 3 is a circuit diagram of an overheat protection circuit of a second embodiment. A difference from the first embodiment resides in that PMOS transistors 37, 39 and 41 are added and the switch circuit 44 is deleted. The PMOS transistor 37 has a gate connected to the gate of the PMOS transistor 42, a drain connected to the inversion input terminal of the comparator 65, and a source connected to the power supply terminal 101. The PMOS transistor 39 has a gate connected to the gate of the PMOS transistor 42, a drain connected to the non-inversion input terminal of the comparator 65, and a source connected to the power supply terminal 101. The PMOS transistor 41 has a gate connected to the gate of the PMOS transistor 42, a drain connected to the comparator 65, and a source connected to the power supply terminal 101. The source of the PMOS transistor 42 is connected to the power supply terminal 101. Others are similar to those in the first embodiment.

The operation of the overheat protection circuit of the second embodiment will be described. Since the PMOS transistor 21 does not allow a leak current to flow when the voltage regulator is operated at the normal temperature, the input terminal of the inverter 32 is pulled up to the voltage VDD of the power supply terminal 101. In response to this voltage, the inverter 32 turns off the switch circuits 33, 34 and 35 via the inverter 31. Thus, the temperature detection circuit 30 is capable of being operated with a small bias current by current mirror circuits configured by the PMOS transistors 42 and 37, the PMOS transistors 42 and 39, and the PMOS transistors 42 and 40 and reducing current consumption at the normal temperature.

When the voltage regulator is operated at a high temperature or the temperature of the voltage regulator becomes high due to heat generated from the PMOS transistor 1 operated as an output transistor, the PMOS transistor 21 generates a leak current. This leak current is mirrored by a current mirror circuit configured by the NMOS transistors 23 and 24 to bring the voltage of the input terminal of the inverter 32 to the voltage VSS of the ground terminal 100. In response to this voltage, the inverter 32 turns on the switch circuits 33, 34 and 35 via the inverter 31. Thus, a current to be as large as the influence of the leak current can be ignored flows from current mirror circuits configured by the PMOS transistors 42 and 36, the PMOS transistors 42 and 38, and the PMOS transistors 42 and 40, so that the temperature detection circuit 30 is capable of improving temperature detection accuracy thereof. The operation of the temperature detection circuit 30 is similar to the first embodiment.

Incidentally, if the leak current detection circuit 20 is capable of detecting the leak current of the transistor of the current source 11 and outputting a detection signal to the current source 11, any configuration may be adopted. The leak current detection circuit 20 is not limited to the circuits as for the leak current detection circuits 20 illustrated in FIG. 2 and FIG. 3.

As described above, the voltage regulator equipped with the overheat protection circuit of the second embodiment is capable of operating the overheat protection circuit with a low bias current when operated at the normal temperature to reduce current consumption and detecting a leak current only when operated at a high temperature to increase a bias current of the overheat protection circuit, thereby improving temperature detection accuracy.

What is claimed is:

1. An overheat protection circuit comprising:
   a temperature detection circuit;
   a bias circuit which allows a bias current to flow in the temperature detection circuit; and
   a leak current detection circuit which detects a leak current of a transistor allowing the bias current of the bias circuit to flow,
   said leak current detection circuit controlling the bias current when the leak current is detected.

2. An overheat protection circuit comprising:
   a temperature detection circuit;
   a bias circuit which allows a bias current to flow in the temperature detection circuit; and
   a leak current detection circuit which detects a leak current of a transistor allowing the bias current of the bias circuit to flow;
   said leak current detection circuit controlling the bias current when the leak current is detected;
   wherein the leak current detection circuit includes:
   a first transistor having a gate and a source connected to each other and allowing the leak current to flow,
   a leak current mirror circuit which mirrors the leak current, and
   a pull-up circuit connected to an output of the first current mirror circuit.

3. The overheat protection circuit according to claim 2, wherein the bias circuit includes:
   a first current source,
   a first current mirror circuit which mirrors the current of the first current source and allows the bias current to flow, and
   a switch circuit which controls the operation of the first current mirror circuit in response to the signal from the leak current detection circuit.

4. The overheat protection circuit according to claim 3, wherein the bias circuit further includes a second current mirror circuit which mirrors the current of the first current source and allows the bias current to flow.

5. A voltage regulator comprising:
   a reference voltage circuit which outputs a reference voltage;
   an output transistor which outputs an output voltage from an output terminal;
   an error amplifier circuit which amplifies a difference between a divided voltage obtained by dividing the output voltage and the reference voltage and outputs the same therefrom, and controls a gate of the output transistor; and
   the overheat protection circuit according to any one of claims 1 to 4, which controls the gate of the output transistor.

* * * * *